(12) United States Patent
Hanson et al.

(10) Patent No.: US 12,249,701 B2
(45) Date of Patent: *Mar. 11, 2025

(54) THERMAL STORAGE DEVICE FOR BATTERIES

(71) Applicant: The Toro Company, Bloomington, MN (US)

(72) Inventors: Brian Algot Hanson, Otsego, MN (US); Paul Frederick Koltz, Chanhassen, MN (US); Robert Luke Anderson, Bloomington, MN (US); Adam Burghardt Stroud, St. Paul, MN (US)

(73) Assignee: The Toro Company, Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,826

(22) Filed: Dec. 11, 2023

(65) Prior Publication Data

US 2024/0106033 A1    Mar. 28, 2024

Related U.S. Application Data

(63) Continuation of application No. 17/975,940, filed on Oct. 28, 2022, now Pat. No. 11,870,049, which is a
(Continued)

(51) Int. Cl.
*H01M 10/659* (2014.01)
*H01M 10/0525* (2010.01)
*H01M 10/617* (2014.01)

(52) U.S. Cl.
CPC ..... *H01M 10/659* (2015.04); *H01M 10/0525* (2013.01); *H01M 10/617* (2015.04)

(58) Field of Classification Search
CPC ............. H01M 10/659; H01M 10/617; H01M 10/0525
See application file for complete search history.

(56) References Cited

U.S. PATENT DOCUMENTS

| 5,585,204 A | 12/1996 | Oshida et al. |
| 8,273,474 B2 | 9/2012 | Al-hallaj et al. |
(Continued)

FOREIGN PATENT DOCUMENTS

WO    03071616    8/2003

OTHER PUBLICATIONS

"CoolPoly D3612—PA6 Specification Sheet," Celanese Corporation, updated Dec. 18, 2018 (2 pages).
(Continued)

*Primary Examiner* — Olatunji A Godo
(74) *Attorney, Agent, or Firm* — Pauly, DeVries Smith & Deffner LLC

(57) ABSTRACT

A thermal storage device for batteries is provided. In some examples, the thermal storage device is provided for a battery pack that includes one or more rechargeable battery cells. In some examples, the lithium ion battery cells are used. The thermal storage device is in thermal contact with the battery cell. The thermal storage device is made of a material that absorbs heat that is given off by battery cells during discharge. In some examples, the thermal storage device is made of a plastic material. The material has a relatively low thermal conductivity but a relatively high specific heat capacity, allowing heat energy to be stored in the thermal storage device. The thermal storage device prevents the battery pack from overheating during use. The thermal storage device defines one or more cell receiving volumes. In some examples, an axially extending relief volume is provided.

20 Claims, 4 Drawing Sheets

Related U.S. Application Data continuation of application No. 16/809,223, filed on Mar. 4, 2020, now Pat. No. 11,502,353.

(60) Provisional application No. 62/813,454, filed on Mar. 4, 2019.

(56) References Cited

U.S. PATENT DOCUMENTS

| | | | |
|---|---|---|---|
| 9,099,762 B2 | 8/2015 | Yang et al. | |
| 9,843,078 B2 | 12/2017 | Ambrosio | |
| 11,502,353 B2 | 11/2022 | Hanson et al. | |
| 11,870,049 B2 * | 1/2024 | Hanson | H01M 10/653 |
| 2005/0202310 A1 | 9/2005 | Yahnker et al. | |
| 2010/0266886 A1 | 10/2010 | Joswig et al. | |
| 2011/0189526 A1 | 8/2011 | Michelitsch et al. | |
| 2012/0058380 A1 | 3/2012 | Wang et al. | |
| 2013/0209858 A1 | 8/2013 | Schmitt et al. | |
| 2013/0244090 A1 | 9/2013 | Tanaka et al. | |
| 2015/0221914 A1 | 8/2015 | Page et al. | |
| 2015/0303531 A1 | 10/2015 | Willgert et al. | |
| 2016/0226042 A1 | 8/2016 | Hartmann et al. | |
| 2016/0226114 A1 | 8/2016 | Hartmann et al. | |
| 2016/0327226 A1 | 11/2016 | Kaag et al. | |
| 2018/0131054 A1 | 5/2018 | Waid | |
| 2020/0212384 A1 | 7/2020 | Baumann et al. | |
| 2020/0287254 A1 | 9/2020 | Hanson et al. | |
| 2021/0273283 A1 | 9/2021 | Dittmann et al. | |
| 2023/0122017 A1 | 4/2023 | Hanson et al. | |

OTHER PUBLICATIONS

"Non-Final Office Action," for U.S. Appl. No. 16/809,223 mailed Mar. 17, 2022 (17 pages).

"Non-Final Office Action," for U.S. Appl. No. 17/975,940 mailed Mar. 2, 2023 (14 pages).

"Notice of Allowance," for U.S. Appl. No. 16/809,223 mailed Jul. 15, 2022 (8 pages).

"Notice of Allowance," for U.S. Appl. No. 17/975,940 mailed Aug. 31, 2023 (7 pages).

"PCC Thermal Runaway and Thermal Management Cell Holder Product Sheet," AllCell Technologies, 2019 (2 pages).

"RAYMAX Panoramic Ultra Product Sheet," Raytec Ltd, 2016 (3 pages).

"Response to Non Final Office Action," for U.S. Appl. No. 17/975,940, filed on Jun. 1, 2023 (14 pages).

"Response to Non-Final Rejection," mailed on Mar. 17, 2022 for U.S. Appl. No. 16/809,223, submitted via EFS-Web on Jun. 16, 2022, 13 pages.

Novack, Scott "UAVs and the Balance of Power," AllCell Technologies, Apr. 2017 (4 pages).

* cited by examiner

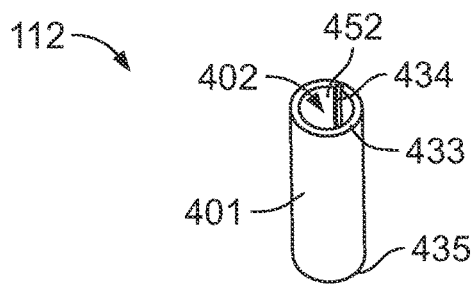
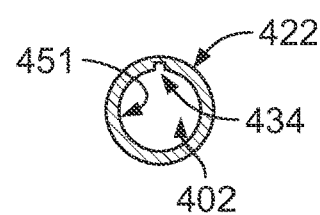
FIG. 4A  FIG. 4B
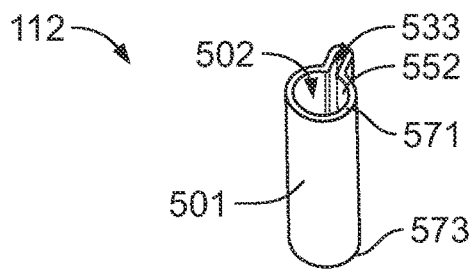
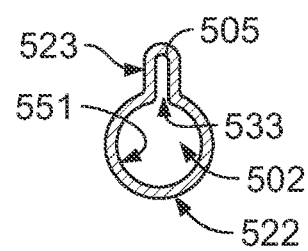
FIG. 5A  FIG. 5B
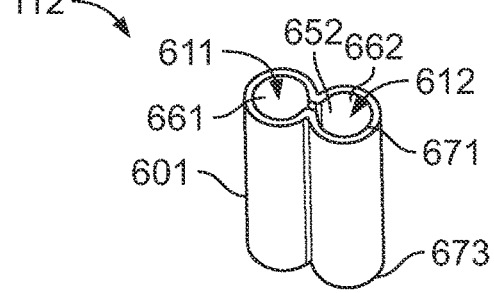
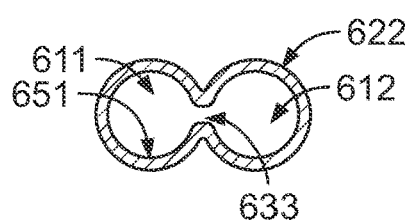
FIG. 6A  FIG. 6B
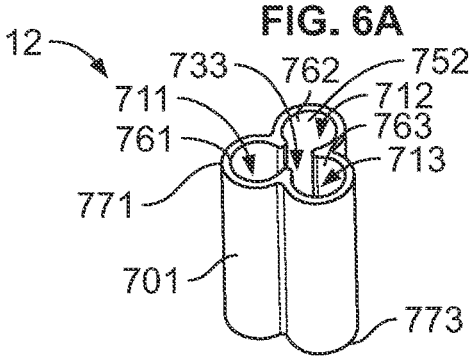
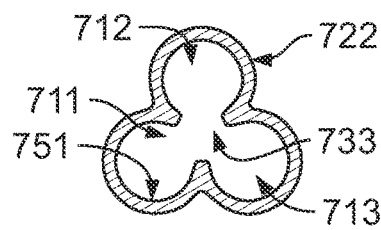
FIG. 7A  FIG. 7B
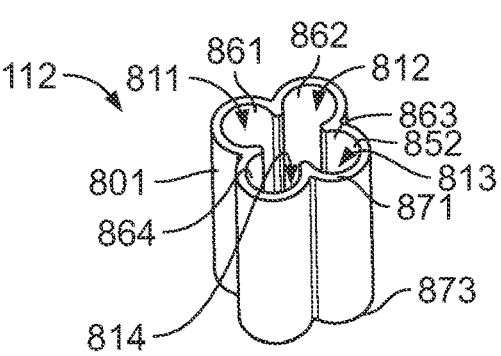
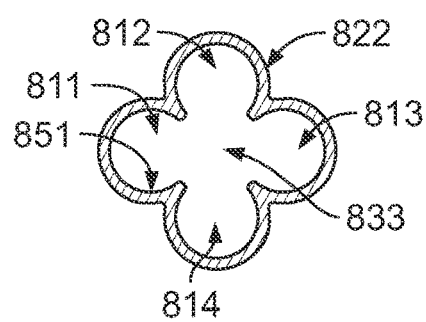
FIG. 8A  FIG. 8B

| Material Name | Exemplary Thermal Conductivity | Exemplary Density | Exemplary Specific Heat Capacity | Volumetric Heat Capacity* |
|---|---|---|---|---|
| Units | Watts / (m*K) | kg / m$^3$ | J / (kg*K) | kJ / (K*m$^3$) |
| HDPE | 0.460 | 953 | 2400 | 2287.2 |
| Aluminum | 204.000 | 2700 | 910 | 2457 |
| D3612 Coolpoly | 14.000 | 1600 | 1100 | 1760 |
| ABS | 0.180 | 1080 | 1675 | 1809 |
| PC | 0.210 | 1200 | 1500 | 1800 |
| PA66 GF30 | 0.450 | 940 | 1500 | 1410 |
| Air | 0.020 | 1.2 | 1000 | 1.2 |

* Volumetric Heat Capacity is equal to the product of Material Density and Specific Heat Capacity

FIG. 9

THERMAL STORAGE DEVICE FOR BATTERIES

This application is a continuation of U.S. patent application Ser. No. 17/975,940, filed Oct. 28, 2022, which is a continuation of U.S. patent application Ser. No. 16/809,223, filed Mar. 4, 2020, which claims the benefit of U.S. Provisional Application No. 62/813,454, filed Mar. 4, 2019, the contents of which are herein incorporated by reference.

FIELD

The present disclosure relates to thermal management devices for rechargeable batteries.

BACKGROUND

Rechargeable lithium ion batteries produce heat when charging and discharging. This heat must be removed from the system, otherwise the battery cells can overheat, causing thermal shutdown, especially during discharge. The battery cells must be maintained under a temperature threshold for the duration of discharge, i.e., when the battery is being used to provide energy to a working machine. Once the battery is entirely discharged, the battery stops adding heat to the system.

Lithium ion batteries can operate at temperature ranges between about −20° C. and 60° C. The high-temperature thermal cutoff limit for a lithium ion battery is around 75° C. Previous battery pack temperature management solutions pulled excess heat away from hot components and released the heat into the environment so that more heat could be absorbed and released. Traditional multi-cell lithium ion battery packs have an "open" cell arrangement, which means that individual battery cells are separated by air gaps.

A number of different solutions exist to manage the heat produced by the batteries during charge and discharge. Typical thermal management devices attempt to keep the battery pack at a stable temperature by removing heat at a rate that matches the rate at which heat is generated by the battery. A heat sink comprising a metal can be used to conduct heat away from the batteries. Traditionally, metals like aluminum are used for heat sinking Other solutions employ a phase change material wrapped around the battery cells to slow temperature increase. In this case, the latent heat of melting of the phase change material absorbs heat energy from the battery cells without changing the temperature of the heat sink material. Still other solutions include heatsink materials comprising graphite infused with waxes that retain their shape even while the phase change is happening.

SUMMARY

Some examples of the technology disclosed herein provide a battery assembly comprising one or more battery cells and a thermal storage device. Each of the one or more battery cells has a generally cylindrical shape, two cell ends, and a cell wall extending in an axial direction between the two cell ends. The cell wall defines a cell wall surface area. The thermal storage device comprises a plastic material and defines one or more cell receiving volumes for receiving the one or more battery cells. The thermal storage device has an inner surface and a cross-section with a closed outer perimeter. The inner surface of the thermal storage device defines a relief volume that facilitates insertion of the one or more cells into the one or more cell receiving volumes during assembly of the battery assembly. An axially extending portion of each cell wall is not in contact with the thermal storage device when the one or more battery cells are inserted into the thermal storage device.

In some examples, the one or more cell receiving volumes defined by the thermal storage device is a single cell receiving volume for a single battery cell, and the inner surface of the thermal storage device defines an axially-extending relief notch. In some examples, the thermal storage device defines two or more cell receiving volumes that share a relief volume defined between the two or more cell receiving volumes. In some examples, the plastic material of the thermal storage device maintains a solid phase at operating temperatures of the one or more battery cells. In some examples, the plastic material is a thermoplastic material. In some examples, the plastic material has a thermal conductivity of between about 0.1 and 4.0 W/(m·K). In some examples, the plastic material has a specific heat capacity of at least 1200 J/(kg·K). In some examples, the inner surface of the cell receiving volume is configured to contact at least 75% of the cell wall surface area when the battery cell is disposed in the cell receiving volume.

Some examples of the technology disclosed herein provide a battery assembly comprising a plurality of battery cells and a plurality of thermal storage devices. Each battery cell in the plurality of battery cells has a generally cylindrical shape, two cell ends, and a cell wall extending in an axial direction between the two cell ends. The cell wall defines a cell wall surface. Each of the thermal storage devices defines a first cell receiving volume, a second cell receiving volume, and an internal relief volume disposed between the first cell receiving volume and the second cell receiving volume. Each of the cell receiving volumes has a surface area. Each battery cell is disposed in one of the cell receiving volumes, and the surface area of the cell receiving volume in which the battery cell is disposed contacts at least 75% of the cell wall surface.

In some examples, the internal relief volume of each thermal storage device extends axially between a first end and a second end of each of the thermal storage device. In some examples, each thermal storage device has a cross-section having a closed outer perimeter, and the plurality of thermal storage devices are separated from one another in the battery assembly by air gaps. In some examples, each thermal storage device comprises a material that maintains a phase at operating temperatures of the plurality of battery cells. In some examples, each thermal storage device has a thermal conductivity of between about 0.1 and 1.0 W/(m·K). In some examples, each thermal storage device has a specific heat capacity of at least 1200 J/(kg·K).

Some examples of the technology disclosed herein provide a battery assembly with a battery cell and a thermal storage device. The battery cell has two cell ends and an exterior cell surface extending between the two cell ends. The thermal storage device is in contact with at least a portion of the exterior cell surface of the battery cell. The thermal storage device has an inner surface defining one or more cell receiving volumes for receiving the battery cell. The thermal storage device is made of a solid material having a thermal conductivity of between about 0.1 and 1.0 W/(m·K).

In some examples, the exterior cell surface of the battery cell is in thermal contact with the inner surface of the cell receiving volume of the thermal storage device such that heat is transferred from the battery cell to be stored in the thermal storage device. In some examples, the thermal storage device has a specific heat capacity of at least 1500

J/(kg·K). The battery assembly of claim 20, comprising a plurality of battery cells and a plurality of thermal storage devices, wherein each thermal storage device has a closed outer perimeter. In some examples, each cell receiving volume is configured such that the inner surface of the cell receiving volume contacts at least 90% of the exterior cell surface of the battery cell when the battery cell is disposed in the cell receiving volume. In some examples, the thermal storage device has a density of at most about 1500 kg/m³.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense.

BRIEF DESCRIPTION OF THE DRAWINGS

FIG. 4A is a perspective view of a thermal storage device according to some examples.

FIG. 4B is a cross-sectional view of the example of FIG. 4A.

FIG. 5A is a perspective view of a thermal storage device according to an alternative example.

FIG. 5B is a cross-sectional view of the example of FIG. 5A.

FIG. 6A is a perspective view of a thermal storage device according to an alternative example.

FIG. 6B is a cross-sectional view of the example of FIG. 6A.

FIG. 7A is a perspective view of a thermal storage device according to an alternative example.

FIG. 7B is a cross-sectional view of the example of FIG. 7A.

FIG. 8A is a perspective view of a thermal storage device according to an alternative example.

FIG. 8B is a cross-sectional view of the example of FIG. 8A.

FIG. 9 is a table detailing thermal properties of various materials.

Figure 1:
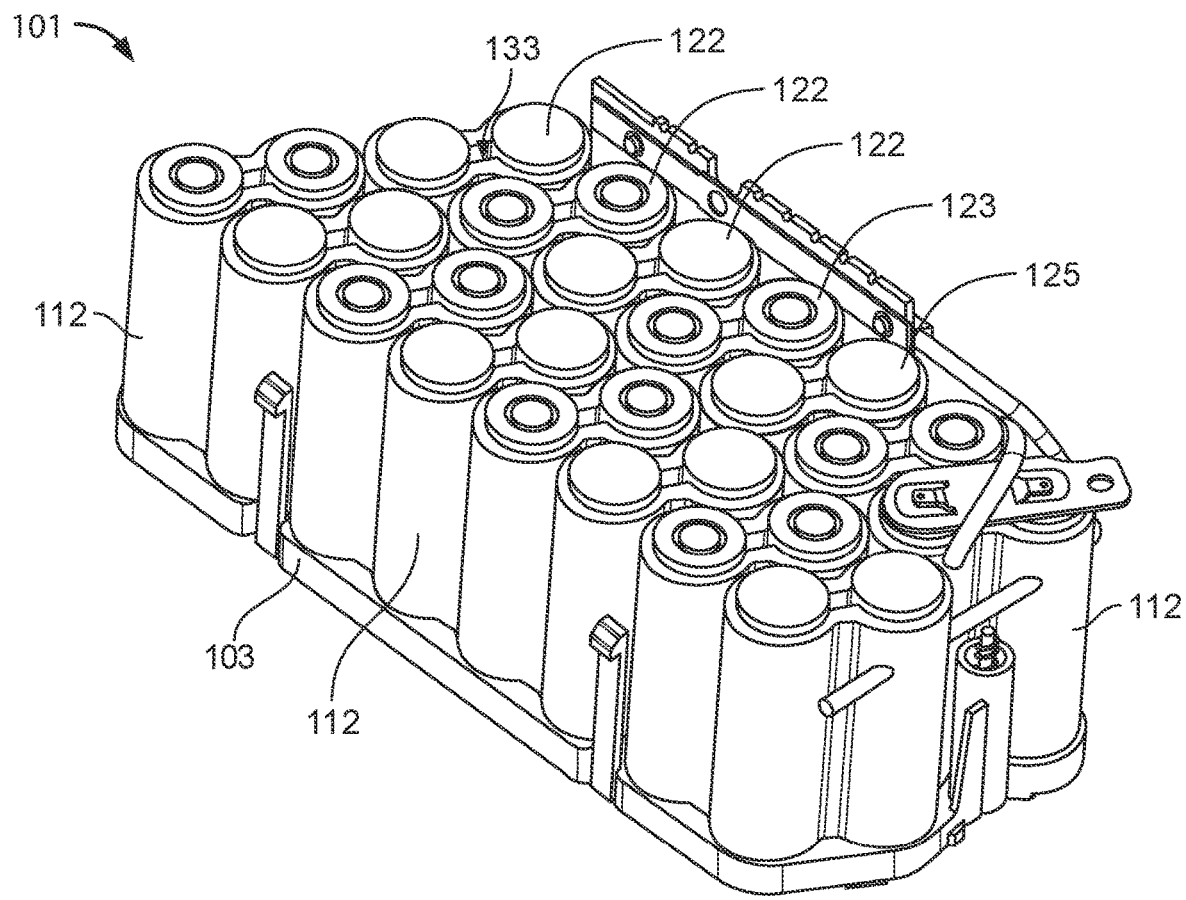
FIG. 1 is a perspective view of a battery pack according to some examples.

While embodiments herein are susceptible to various modifications and alternative forms, specifics thereof have been shown by way of example and drawings, and will be described in detail. It should be understood, however, that the scope herein is not limited to the particular examples described. On the contrary, the intention is to cover modifications, equivalents, and alternatives falling within the spirit and scope herein.

DETAILED DESCRIPTION

The disclosed technology relates to heat storage devices for lithium ion batteries. The technology disclosed herein uses passive heat storage. In a battery assembly made up of one or more battery cells, heat is created during discharge of the battery assembly, and the heat produced by each battery cell is absorbed by a thermal storage device made up of a thermal storage medium that retains one or more of the battery cells. In high-power applications, the battery can likely be fully depleted without needing to be shut down due to excess heat. After the battery has been fully depleted, the thermal storage medium can cool during a time of charging or a time of no activity.

The disclosed technology stores heat in the thermal storage medium that is in thermal contact with the walls of the battery cells in a battery assembly instead of attempting to conduct heat out of the battery assembly. The amount of heat transferred out of the battery assembly is small compared to the amount of heat that is absorbed by the mass of the thermal storage medium. For example, in various examples, the amount of heat transferred out of the battery assembly is less than 10%, less than 5%, or less than 2% of the heat that is absorbed by the mass of the thermal storage medium. With a sufficient volume of thermal storage medium, the heat produced by the batteries as the batteries are being discharged will be absorbed by the thermal storage medium and held within the thermal storage medium until battery discharge is complete. The temperature of the battery cells increases linearly, but at a slower rate.

In some applications, battery cells inside a battery assembly are permanently enclosed inside of a protective case. In these applications, it is difficult to conduct heat away from the batteries and into the environment. Consider a scenario in which a lithium ion battery pack is fully sealed. Air cannot leave the battery pack, so it remains stagnant. The heat generated by the cells can conduct to the outside surface of the cell walls very quickly, but the heat cannot leave the battery pack because the conductivity of the stagnant air surrounding the battery cells is very low.

To prevent the battery cells from overheating, excess heat needs to be pulled from the cells. There are three ways to remove heat: radiation, conduction, and convection. In most heat transfer scenarios, radiation is the smallest contributor to heat transfer between objects.

Conduction is the transfer of heat through substances without movement of the material. Metals conduct heat very well. Plastics are not good heat conductors, and stagnant gasses are very poor conductors of heat. Previous battery systems use metal heat sinks to conduct transfer heat away from battery cells. Conduction generally does not remove heat as quickly as convection.

Convection heat transfer techniques are also used in previous battery system designs. Some previous technologies used metal heat sinks with fins combined with airflow from a fan. These systems can be both physically large and costly. In applications in which an enclosed battery pack needs to be small, compact, lightweight, and cost-effective, metal heatsinks and fans are not optimal. Furthermore, forced convection can introduce moisture and contaminants into the battery pack, which can decrease reliability.

The inventors have discovered that conduction can be effective over short distances. Conduction is a passive solution with potential to be inexpensive and very reliable.

FIG. 9 is a table showing exemplary thermal properties for a variety of different materials: high density polyethylene (HDPE), aluminum, thermally conductive plastic mixtures, acrylonitrile butadiene styrene (ABS), polycarbonate (PC), polyimide 66 with 30% glass fiber content (commercially available as TECAMID® 66 GF30 from Ensinger Plastics of Washington, PA), and air. Thermally conductive plastic mixtures are plastics that are modified to increase thermal conductivity. For example, additives such as ceramics and graphite can be added to a base plastic material to make the mixture thermally conductive. One example of a thermally conductive plastic is D3612 Coolpoly Thermally Conductive Polyamide (PA66/6), available commercially from Celanese Corporation, located in Irving, Texas.

Two thermal properties are commonly considered for choosing a thermal storage medium. The first is thermal conductivity, measured in watts per meter kelvin (W/(m·K)). Thermal conductivity indicates how effective a particular material is at conducting heat through the material. For example, aluminum has a very high thermal conductivity—around 200 W/(m·K).

A second thermal property that has an impact on the performance of heat storage materials is the specific heat capacity of the material. Specific heat capacity refers to the amount of heat energy a material can absorb per unit increase in temperature. Specific heat capacity is mass dependent, and is measured in joules per kilogram per kelvin (J/(kg·K)). Some materials require more energy than others to raise the temperature of the material. The specific heat capacity of a material multiplied by its density results in a volumetric representation of how much heat energy is required to change the temperature of the material. This quantity is volumetric heat capacity, which is independent of mass and is measured in joules per kelvin (J/K).

Volumetric heat capacity is a measure of the amount of heat energy that a material can absorb before the material increases in temperature. Material volumes with a high heat capacity change temperature more slowly that materials of equivalent volume with a low heat capacity when exposed to the same amount of heat.

Heat transfer from one material to another is driven by a temperature gradient. If a thermal storage medium has a high heat capacity, an adjacent battery cell will increase in temperature more quickly than the thermal storage medium material, creating a situation in which the temperature gradient increases continuously, leading to a corresponding increase in heat transfer.

Referring to FIG. 9, it can be seen that HDPE has an exemplary thermal conductivity of less than one W/(m·K), and aluminum has an exemplary thermal conductivity of around 200 W/(m·K). But the two materials have a similar heat capacity (ability to absorb heat) because the specific heat capacity of HDPE is around three times the specific heat capacity of aluminum. Aluminum makes up for its deficit in specific heat capacity by having three times the density of HDPE. Therefore, the volumetric heat capacity of aluminum and HDPE are similar HDPE has a relatively low thermal conductivity and a relatively high specific heat capacity compared to aluminum, while also having a lower density, making the HDPE material more lightweight per unit volume.

One limiting factor present in a closed lithium ion battery pack is the thermal resistance of the interface between the heat storage medium and the battery cell walls—that is, the resistance of heat transfer from a first material to an adjacent material that is in thermal contact with the first material. If thermal resistance is high, the thermal conductivity of the heat storage medium cannot be utilized. Thermal resistance is correlated to the surface roughness of two conforming surfaces in contact with each other, and to the pressure with which the two surfaces contact each other. Two surfaces that are each very smooth and that are pressed together tightly have a lower thermal resistance across the two materials. The thermal resistance between the two materials is the bottle neck of the heat transfer process in a closed battery. Through testing, the inventors have found that in a closed battery pack assembly, for thermal conductivity values above about 0.5 W/(m·K), an increased thermal conductivity does not lead to a corresponding improvement in performance as a heat storage device.

In some examples, high density polyethylene (HDPE) is selected for its high specific heat capacity, elasticity, and because it is an inherent dielectric. However, many other thermoplastic polymers can be used in connection with the disclosed technology. For example, thermoplastics and mixtures of thermoplastics such as acrylonitrile butadiene styrene (ABS), polycarbonate (PC), PC-ABS (polycarbonate-acrylonitrile butadiene styrene), or PA-ABS (polyamide-acrylonitrile butadiene styrene) can be used alone or in combination. In another example, a thermally conductive plastic material such as D3612 Coolpoly Thermally Conductive Polyamide (PA66/6) can be used. Forming a thermal storage device using materials such as thermoplastics, HDPE, ABS, PC, PC-ABS, PA-ABS, and similar materials does not require complicated phase change mixtures or processes, because they are solid materials that do not undergo a phase change in the temperature operating conditions of the battery pack. Additionally, because HDPE and other thermoplastics are inherent dielectrics, they require no extra dielectric layers, tapes, or additives to be used in a battery pack. Other plastic materials and mixtures of plastic materials with other materials may also be used. The term plastic as used herein means any of a wide range of synthetic or semi-synthetic organic compounds that can be molded into solid objects.

In some examples, the battery pack has an operating temperature lower than 75 Celsius (C). In some examples, the battery pack has an operating temperature at or below about 75 C, about 70 C, about 65 C, or about 60 C. In some examples, the battery has an operating temperature of at least about −20 C, at least about −15 C, or at least about −10 C. In some examples, the battery has an operating temperature between about −20 C and about 60 C, or between about −20 C and about 75 C.

Figure 3A:
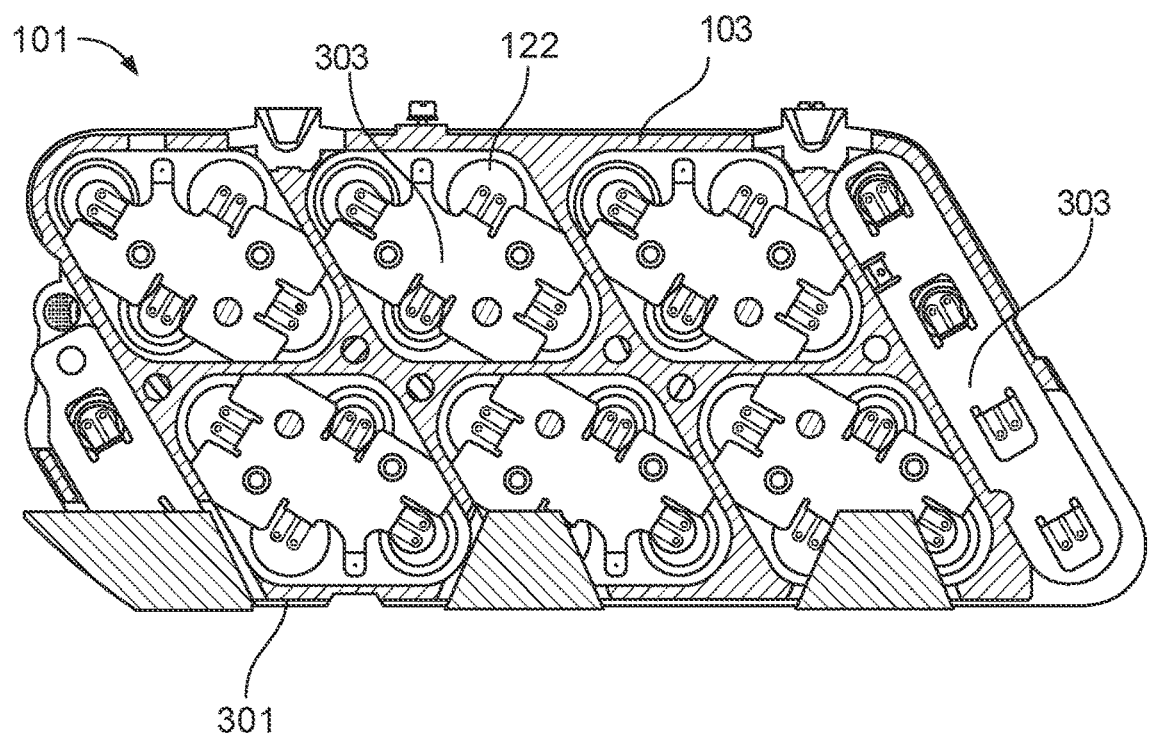
FIG. 3A is a bottom view of the battery pack of FIG. 1.
Figure 3B:
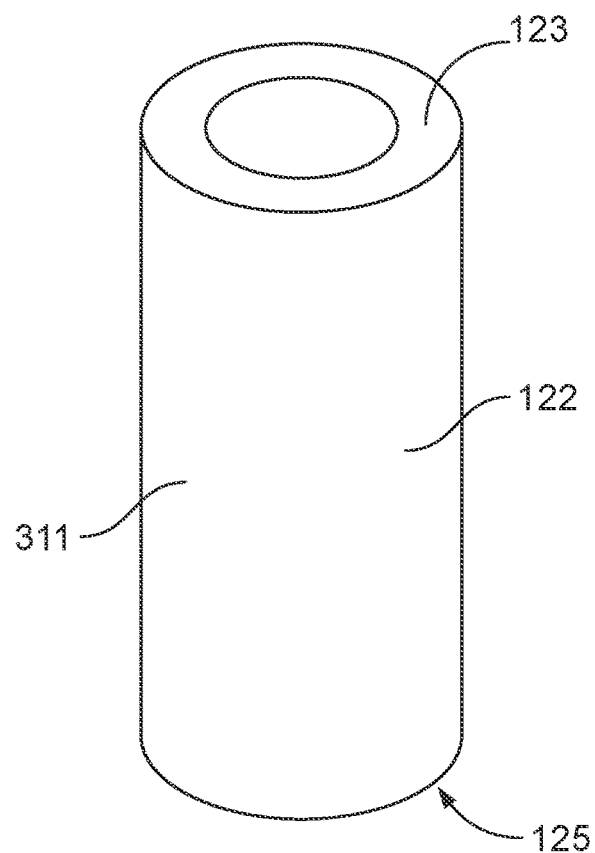
FIG. 3B is a perspective view of a battery cell according to some examples.

Turning now to particular examples, FIG. 1 is a perspective view of a battery pack or battery assembly according to some examples. FIG. 3A is a bottom view of the battery pack of FIG. 1. FIG. 3 shows an end 301 that retains the battery cells 122 and the thermal storage devices 112. The battery pack 101 houses one or more battery cells 122. The battery cells 122 can be, for example, cylindrical cell batteries. A cylindrical cell battery has a generally cylindrical shape. In the example of FIG. 1, the batteries are grouped in pairs. FIG. 3B is perspective view of an example of an individual battery cell 122 with a generally cylindrical shape. The battery cells 122 each have two cell ends: a first end 123, which can be a positive terminal of the battery, and a second end 125, which can be a negative terminal of the battery. Each battery cell has a longitudinal axis and the battery cells 122 each have a cell wall 311 having an exterior cell wall surface extending in an axial direction between the two cell ends. The exterior cell wall surface defines a cell wall surface area.

The battery pack 101 includes a cell holder 103, which provides part of a housing that retains the battery cells 122 together. A battery management system 205, which can include a circuit board, can also be provided. Battery weld tabs 303 electrically connect the batteries and enable transfer of energy out of the battery pack 101.

In the example of FIG. 1, each pair of battery cells 122 is held in a thermal storage device 112 and fifteen thermal storage devices 112 holding thirty battery cells are arranged in a compact format. Many other examples of thermal storage device configurations and arrangements of thermal storage devices are possible and will be described herein.

Due to manufacturing tolerances, cylindrical cell batteries can vary in size by small amounts from unit to unit. In many engineering applications, these manufacturing tolerances are acceptable. As will be discussed later in relation to FIGS. 4-8, it is desirable to have tight contact with the inner surface of the thermal storage device. A close fit between the cell wall of the cylindrical cell battery and the inner surface of the thermal storage device reduces thermal resistance across the interface between the cell wall and the thermal storage device. The efficiency of the thermal storage device can be further increased by increasing the percentage of surface area of the battery cell wall that contacts the inner surface of the thermal storage device. A greater percentage of surface area contact increases the amount of heat that can be taken in and stored by the thermal storage device. In various embodiments, thermal storage devices can have the ability to flex to accommodate a range of sizes of battery cells consistent with manufacturing tolerances while providing tight contact between the battery cell wall and the thermal storage device.

Figure 2:
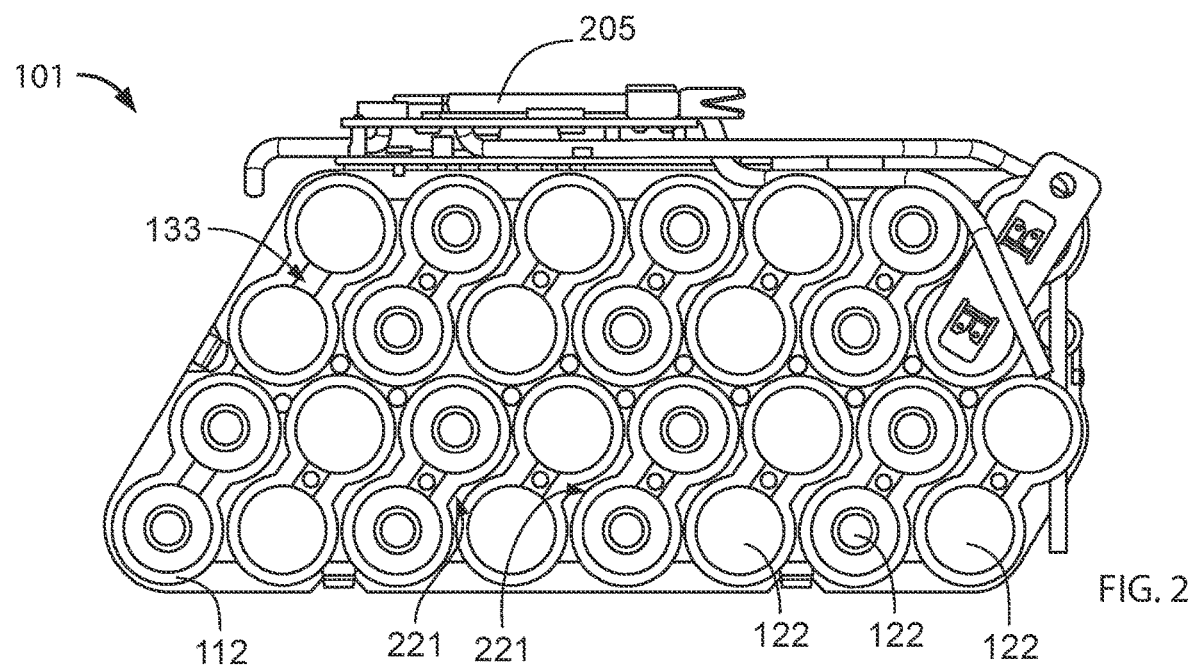
FIG. 2 is a top view of the battery pack of FIG. 1.

The battery pack 101 of FIG. 1 includes one or more thermal storage devices 112. FIG. 2 is a top view of the battery pack of FIG. 1. In some examples, including that of FIG. 2, the thermal storage devices 112 are arranged in the battery pack 101 in a lattice. In some examples, the battery pack 101 contains air gaps 221 between neighboring thermal storage devices 112 in the lattice. In the example of FIG. 1, the battery cells 122 are enclosed within the thermal storage devices 112, with the cell walls of each battery cell 122 contacting the inner surface of the thermal storage device 112. In the example of FIG. 1, a relief volume 133 in the thermal storage device 112 provides a void between two battery cells 122. As can be seen in FIG. 2, an axially extending portion of the cell wall of each battery cell 122 is not in contact with the thermal storage device 112. The relief volume 133 facilitates insertion of the battery cells 122 into the thermal storage device 112 when the battery pack 101 is assembled. The material of the thermal storage device 112 provides a small amount of elasticity so that the relief volume 133 of the thermal storage device 112 can flex around the battery cells 122 to maintain good contact pressure, allowing the thermal storage device 112 to accommodate a range of cell diameters corresponding to manufacturing tolerances.

FIGS. 4-8 are perspective and cross-sectional view of different examples of the thermal storage device 112. FIGS. 6A and 6B show the thermal storage device 112 of FIGS. 1, 2 and 3A. FIGS. 4-5 and 7-8 show alternative thermal storage devices that can be used in a battery assembly in place of the thermal storage device 112 of FIGS. 6A and 6B, in an arrangement of one or more thermal storage devices to form a battery assembly. Each thermal storage device has a structure to allow the thermal storage device to flex around one or more battery cells to accommodate a range of cell diameters. This allows the various examples to tolerate variations in battery cell diameter due to manufacturing. Each of the thermal storage devices in FIGS. 4-8 define one or more cell receiving volumes for receiving one or more battery cells. The thermal storage device in each example has a cross-section with a closed outer perimeter, where the cross-section is perpendicular to a longitudinal axis of the cylindrical battery cell. The word "closed" refers to the fact that the outer perimeter is continuous and unitary, with a complete, unbroken wall surrounding the cell. The thermal storage device in each example has an inner surface defining a relief volume adjacent to the cell receiving volume. The relief volume facilitates insertion of a battery cell into the cell receiving volume. At the relief volume, the thermal storage device does not contact the battery cell wall along an axially-extending portion of the battery cell.

FIG. 4A is a perspective view of a thermal storage device according to some examples, and FIG. 4B is a cross-sectional view of the example of FIG. 4A. Thermal storage device 401 has a cell receiving volume 402 and a closed outer perimeter 422. The inner surface 452 defines the internal perimeter 451 of the cell receiving volume 402. An internal relief volume 434 axially extends from a first end portion 433 to a second end portion 435 of the thermal storage device 401. In the example of FIG. 4, the internal relief volume 434 is an axially-extending relief notch in the inner surface 452 of the thermal storage device 401 that creates a discontinuity in the inner surface 452 of the thermal storage device 401. In this example, there is no discontinuity on the outer perimeter 422, meaning that the cross-section of the outer perimeter 422 is approximately circular. The internal relief volume 434 allows the thermal storage device 401 to flex around a battery cell to accommodate a range of cell diameters. As previously noted, it is desirable to have tight contact between the wall of the battery cell and the inner surface of the thermal storage device 112, but due to manufacturing tolerances, individual battery cells can vary in diameter. A close fit between the cell wall of the cylindrical cell battery and the inner surface of the thermal storage device reduces thermal resistance across the interface between the cell wall and the thermal storage device.

FIG. 5A is a perspective view of a thermal storage device according to an alternative example, and FIG. 5B is a cross-sectional view of the example of FIG. 5A. Thermal storage device 501 has a cell receiving volume 502 and a closed outer perimeter 522. An inner surface 552 defines the internal perimeter 551 of the cell receiving volume 502. An internal relief volume 533 axially extends from a first end portion 571 to a second end portion 573. In the example of FIG. 5, the internal relief volume 533 forms a protrusion 523 in the thermal storage device 501, giving the cross-section of the wall 505 of the thermal storage device 501 a keyhole shape. The internal relief volume 533 allows the thermal storage device 501 to flex around a battery cell to accommodate a range of cell diameters while still providing tight contact between the thermal storage device 501 and the battery cell. In the example of FIG. 5, the inner surface 552 of the thermal storage device 501 is configured to contact at least 90 percent of the surface area of the battery cell wall when the battery cells disposed in the cell receiving volume 502. In some examples, the thermal storage device 501 can be configured to contact at least 92 percent of the surface area of the battery cell wall, or at least 95 percent of the surface area of the battery cell wall when the cell is disposed in the cell receiving volume 502. In alternative examples, the thermal storage device 501 can be configured to contact between 75 percent and 95 percent of the surface area of the battery wall. For example, the thermal storage device 501 can be configured to contact at least 75 percent, at least 80 percent, or at least 85 percent of the surface area of the battery wall.

FIG. 6A is a perspective view of a thermal storage device according to an alternative example, and FIG. 6B is a cross-sectional view of the example of FIG. 6A. The thermal storage device 601 has a first cell receiving volume 611 for receiving a first battery cell and a second cell receiving volume 612 for receiving a second battery cell. The thermal storage device 601 has a closed outer perimeter 622. An inner surface 652 defines the internal perimeter 651 of the thermal storage device 601. The first cell receiving volume 611 has an inner surface 661, and the second cell receiving volume 612 has an inner surface 662. An internal relief volume 633 is positioned between the first cell receiving volume 611 and the second cell receiving volume 612. The internal relief volume 633 axially extends from a first end portion 671 of the thermal storage device to a second end portion 673. The internal relief volume 633 allows the thermal storage device 601 to flex around battery cells that are inserted into the first and second cell receiving volumes 611, 612. This allows the thermal storage device 601 to accommodate a range of cell diameters while still providing tight contact between the thermal storage device 601 and the battery cell.

In the example of FIG. 6, the inner surfaces 661, 662 of the first cell receiving volume 611 and the second cell receiving volume 612 are configured to contact at least 80 percent of the surface area of the battery cell wall when the battery cell is disposed in the cell receiving volume 611, 612. In some examples, the inner surfaces 661, 662 of the cell receiving volumes 611, 612 can be configured to contact at least 85 percent of the surface area of a battery cell wall disposed in the cell receiving volume, at least 90 percent of the surface area of the battery cell wall, or at least 95 percent of the surface area of the battery cell wall when a cell is disposed in one of the cell receiving volumes 611 or 612.

FIG. 7A is a perspective view of a thermal storage device according to an alternative example, and FIG. 7B is a cross-sectional view of the example of FIG. 7A. The thermal storage device 701 defines a first cell receiving volume 711, a second cell receiving volume 712, and a third cell receiving volume 713. The thermal storage device 701 has a closed outer perimeter 722. An inner surface 752 defines the internal perimeter 751 of the thermal storage device 701. The first cell receiving volume 711 has an inner surface 761, the second cell receiving volume 712 has an inner surface 762, and the third cell receiving volume 713 has an inner surface 763.

A single central relief volume 733 is disposed between the cell receiving volumes 711, 712, and 713. The internal relief volume 733 axially extends from a first end portion 771 of the thermal storage device to a second end portion 773. The internal relief volume 733 allows the thermal storage device 701 to flex around battery cells that are inserted into the first, second, and third cell receiving volumes 711, 712, and 713. This allows the thermal storage device 701 to accommodate a range of cell diameters while still providing tight contact between the thermal storage device 701 and the battery cell.

In the example of FIG. 7, the inner surfaces 761, 762, 763 of the cell receiving volumes 711, 712, 713 are configured to contact at least 80 percent of the surface area of the battery cell wall when the battery cell is disposed in the cell receiving volume 711, 712, 713. In some examples, the inner surfaces 761, 762, 763 of the cell receiving volumes 711, 712, 713 can be configured to contact at least 85 percent of the surface area of a battery cell wall disposed in the cell receiving volume, at least 90 percent of the surface area of the battery cell wall, or at least 95 percent of the surface area of the battery cell wall when a cell is disposed in one of the cell receiving volumes 711, 712, 713.

FIG. 8A is a perspective view of a thermal storage device according to an alternative example, and FIG. 8B is a cross-sectional view of the example of FIG. 8A. The thermal storage device 801 defines a first cell receiving volume 811, a second cell receiving volume 812, a third cell receiving volume 813, and a fourth cell receiving volume 814. The thermal storage device 801 has a closed outer perimeter 822. An inner surface 852 defines the internal perimeter 851 of the thermal storage device 801. The first cell receiving volume 811 has an inner surface 861, the second cell receiving volume 812 has an inner surface 862, the third cell receiving volume 813 has an inner surface 863, and the fourth cell receiving volume 814 has an inner surface 864.

A single central relief volume 833 is disposed between the cell receiving volumes 811, 812, 813, and 814. The internal relief volume 833 axially extends from a first end portion 871 of the thermal storage device to a second end portion 873. The internal relief volume 833 allows the thermal storage device 801 to flex around battery cells that are inserted into the first, second, third, and fourth cell receiving volumes 811, 812, 813, and 814. This allows the thermal storage device 801 to accommodate a range of cell diameters while still providing tight contact between the thermal storage device 801 and the battery cell.

In the example of FIG. 8, the inner surfaces 861, 862, 863, 864 of the cell receiving volumes 811, 812, 813, and 814 are configured to contact at least 60 percent of the surface area of a battery cell wall when the battery cell is disposed in the cell receiving volume 811, 812, 813, 814. In alternative examples, the inner surfaces 861, 862, 863, 864 of the cell receiving volumes 811, 812, 813, and 814 can be configured to contact between about 60 percent and 95 percent of the cell receiving volumes, for example at least 65 percent of the surface area of a battery cell wall disposed in the cell receiving volume, at least 70 percent of the surface area of a battery cell wall disposed in the cell receiving volume, at least 75 percent of the surface area of a battery cell wall disposed in the cell receiving volume, at least 80 percent of the surface area of a battery cell wall disposed in the cell receiving volume, at least 85 percent of the surface area of a battery cell wall disposed in the cell receiving volume, at least 90 percent of the surface area of the battery cell wall disposed in the cell receiving volume, or at least 95 percent of the surface area of the battery cell wall when a cell is disposed in one of the cell receiving volumes 811, 812, 813, and 814.

It will be appreciated that although particular examples are presented in FIGS. 4-8, other configurations are possible. For example, a thermal storage device could have five, six, seven, eight, or more cell receiving volumes.

Example Dimensions and Volumes

A battery cell disposed inside of the cell receiving volume can be a standard 18650 lithium ion battery cell with a diameter of 18 millimeters (1.8 centimeters) and a height of 65 millimeters (6.5 centimeters), plus or minus a manufacturing tolerance of tenths or hundredths of a millimeter. In alternative examples, a 21700 lithium ion battery cell with a diameter of 21 millimeters (2.1 centimeters) and a height of 70 millimeters (7.1 centimeters) can be used. The disclosed technology can be used with battery cells other than 18650 or 21700 battery cells, and other cell sizes are contemplated.

In various examples, an inner diameter of a cell receiving volume of a thermal storage device matches the outer diameter of the battery cell that it will receive. For example, an inner diameter of a cell receiving volume of a thermal storage device can be about 18 mm or 18.1 mm to receive a battery cell having a diameter 18 mm.

In various examples, a thermal storage device can have a wall thickness of at least about 2 mm, 3 mm, 4 mm, or 5 mm. In various examples, a thermal storage device can have a wall thickness of at most about 7 mm, 6 mm, 5 mm, 4 mm, or 3 mm. In various examples, a thermal storage device can have a wall thickness with a range of at least about 2 mm and at most about 6 mm, at least about 3 mm and at most about 5 mm. In various examples, a thermal storage device can have a wall thickness of about 4.7 mm.

In various examples, a thermal storage device accommodates a single battery cell and has walls of a thermally storage material such as HDPE that makes up a volume of about 9 cm 3 where a battery cell disposed inside of the cell receiving volume has a volume of 15.4 cm 3. In this case, the ratio of the volume of thermally storage material to the volume of the battery cell or cells held by the thermal storage device is 0.58, or 58%. In alternative examples, the ratio can be at least 25 percent, at least 30 percent, at least 40 percent, at least 50 percent, or at least 60 percent. In some examples, the ratio of the volume of the thermally storage material to the volume of the battery cell is less than 60 percent, less than 50 percent, less than 40 percent, or less than 30 percent. In some examples, the ratio is in the range of about 25-60 percent or 30-50 percent.

Methods of Making a Battery Pack

An example of a method for making a battery pack is provided. Although a particular implementation is described here, other ways of assembly a battery pack are possible, and are within the scope of the disclosed technology.

One or more thermal storage devices 112 are formed from a thermally storage material as described above. In some examples, the storage devices can be injection molded or extruded into desired shapes and sizes, depending on the desired configuration of the battery pack.

One or more battery cells 122 are provided. Due to manufacturing tolerances, cells can have different actual voltages. In some examples, individual cell voltages are measured, and the cells 122 are sorted based on the actual voltages of the cells 122 so that the battery pack 101 has a balanced set of cells 122 with a desired average cell voltage.

The sorted cells 122 are inserted into the thermal storage devices 112. The thermal storage devices 112 include a relief volume or volumes that facilitate insertion of the cells 122 into the thermal storage device 112. The cells 122 coupled with the thermal storage devices 112 are inserted into cell holders 103. Quality control checks can be performed to ensure that the cells 122, thermal storage devices 112, and cell holders 103 are correctly assembled. For example, the assembly can be photo-inspected for missing cells and to ensure proper orientation of the positive and negative terminals of the cells 122.

Weld tabs 303 are welded to the cell ends 123, 125 of the battery cells 122. The weld tabs 303 provide electrical connection between the cells 122. Sense lines are soldered to the cells. In some examples, insulation layers are also installed. In some embodiments, the insulation layers are a dielectric sheet used to cover the weld tabs to protect from, such as from shorting hazards, contaminants, and contact with other conductive materials in the pack. A battery management system, which can be a printed circuit board 205, can be provided. The printed circuit board 205 can be soldered or physically plugged in using a connector. Battery pack terminals for connecting the battery pack 101 to an external system are also provided.

A protective thermistor can be provided. The thermistor can be glued in place. The thermistor provides information to the battery management system, charging device, or both so that charging and discharging can be discontinued if an overtemperature state is reached.

The assembled battery pack 101 is inserted into a battery housing (not shown in the figures). The housing can be a protective molded enclosure that prevents external dirt and debris from entering the battery pack. The battery housing is then closed around the battery pack 101. For example, the battery pack 101 can be enclosed inside the battery housing, which is fastened using screws. Alternatively, the battery housing can be sealed around the battery pack 101 using an adhesive.

It should be noted that, as used in this specification and the appended claims, the singular forms include the plural unless the context clearly dictates otherwise. It should also be noted that the term "or" is generally employed in its sense including "and/or" unless the content clearly dictates otherwise. All publications and patent applications referenced in this specification are herein incorporated by reference in their entirety.

The technology has been described with reference to various specific examples. However, it should be understood that many variations and modifications may be made while remaining within the spirit and scope of the technology.

What is claimed is:

1. A battery assembly comprising:
    a plurality of battery cells, each battery cell having a generally cylindrical shape, two cell ends, and a cylindrical cell wall extending in an axial direction between the two cell ends, the cylindrical cell wall defining a cell wall surface area;
    a plurality of thermal storage devices, each thermal storage device comprising a plastic material, each thermal storage device defining one or more cell receiving spaces for receiving the one or more battery cells, each cell receiving space having a contact surface wherein the contact surface is curved, wherein the contact surface is configured to be in tight contact with a portion of the cylindrical cell wall, and wherein the contact surface comprises the plastic material; and
    a lattice arrangement of the battery cells and thermal storage devices, wherein:
        an axially extending portion of each cell wall is not in contact with any of the thermal storage devices when the battery cells are inserted into the thermal storage device;
        the cell walls of any two neighboring battery cells are not in contact; and
        the plurality of thermal storage devices are separated from one another in the battery assembly.

2. The battery assembly of claim 1, wherein the one or more cell receiving spaces defined by the thermal storage device is a single cell receiving space for a single battery cell, and the contact surface of the thermal storage device defines an axially-extending relief notch.

3. The battery assembly of claim 1, wherein the thermal storage device defines two or more cell receiving spaces configured to receive the one or more battery cells.

4. The battery assembly of claim 1, wherein the plastic material of the thermal storage device maintains a solid phase at operating temperatures of the one or more battery cells.

5. The battery assembly of claim 1, wherein the plastic material is a thermoplastic material.

6. The battery assembly of claim 1, wherein the plastic material has a thermal conductivity of between about 0.1 and 4.0 W/(m·K).

7. The battery assembly of claim 1, wherein the plastic material has a specific heat capacity of at least 1200 J/(kg·K).

8. The battery assembly of claim 1, wherein the contact surface of the cell receiving space is configured to contact at least 75% of the cell wall surface area when the battery cell is disposed in the cell receiving volume.

9. The battery assembly of claim 1, wherein each thermal storage device comprises an inner surface defining an internal relief volume that extends axially between a first end and a second end of the thermal storage device, wherein the inner surface defining the internal relief volume does not contact the battery cell wall.

10. The battery assembly of claim 1, wherein neighboring thermal storage devices are separated from one another in the battery assembly by air gaps.

11. A battery assembly comprising:
a plurality of battery cells, each battery cell having two cell ends and a cell wall extending in an axial direction between the two cell ends, wherein the cell wall comprises an exterior cell surface, wherein a positive terminal of the battery cell is located at one of the two cell ends and a negative terminal of the battery cell is located at another of the two cell ends; and
a plurality of thermal storage devices, each thermal storage device defining one or more cell receiving spaces for receiving the one or more battery cells, each thermal storage device in contact with at least a portion of the exterior cell surface of at least one battery cell, each thermal storage device having a contact surface for receiving the at least one battery cell, wherein the contact surface is configured to contact at least a portion of the exterior cell surface of the at least one battery cell, the contact surface comprising a solid material having a thermal conductivity of at least 0.1 and less than 1.0 W/(m·K); and
wherein the plurality of battery cells and the plurality of thermal storage devices are in a lattice arrangement, wherein at least a portion of the exterior cell surface of each of the battery cells is in contact with at least one of the thermal storage devices, and wherein the plurality of thermal storage devices are separated from one another in the battery assembly.

12. The battery assembly of claim 11, wherein the exterior cell surface of each battery cell is in thermal contact with the contact surface of at least one of the thermal storage devices such that heat is transferred from the battery cell to be stored in the at least one of the thermal storage devices.

13. The battery assembly of claim 11, wherein each thermal storage device has a specific heat capacity of at least 1500 J/(kg·K).

14. The battery assembly of claim 11, wherein each thermal storage device has a closed outer perimeter.

15. The battery assembly of claim 11, wherein each cell receiving volume is configured such that the contact surface of the cell receiving volume contacts at least 90% of the exterior cell surface of each battery cell when the battery cell is disposed in the cell receiving volume.

16. The battery assembly of claim 11, wherein the thermal storage device has a density of at most about 1500 kg/m$^3$.

17. The battery assembly of claim 11, wherein at least 75% of the exterior cell surface of each of the plurality of battery cells is in contact with the contact surface of at least one of the plurality of thermal storage devices.

18. The battery assembly of claim 11, wherein an axially extending portion of each battery cell wall is not in contact with any of the thermal storage devices when the battery cells are inserted into the thermal storage device.

19. The battery assembly of claim 11, wherein each thermal storage device comprises an inner surface defining an internal relief volume that extends axially between a first end and a second end of the thermal storage device, wherein the inner surface defining the internal relief volume does not contact the battery cell wall.

20. The battery assembly of claim 11, wherein neighboring thermal storage devices are separated from one another in the battery assembly by air gaps.

* * * * *